(12) United States Patent
Kumar

(10) Patent No.: US 10,999,398 B1
(45) Date of Patent: May 4, 2021

(54) SCAN PROTECTION WITH RATE LIMITING

(71) Applicant: VMware, Inc., Palo Alto, CA (US)

(72) Inventor: Raju Kumar, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 321 days.

(21) Appl. No.: 15/094,890

(22) Filed: Apr. 8, 2016

Related U.S. Application Data

(60) Provisional application No. 62/212,885, filed on Sep. 1, 2015.

(51) Int. Cl.
| | | |
|---|---|---|
| *G06F 16/24* | (2019.01) | |
| *H04L 29/08* | (2006.01) | |
| *H04L 29/06* | (2006.01) | |
| *H04L 12/26* | (2006.01) | |
| *H04L 12/911* | (2013.01) | |
| *H04L 29/12* | (2006.01) | |
| *H04L 12/743* | (2013.01) | |
| *G06F 16/2458* | (2019.01) | |

(52) U.S. Cl.
CPC .......... *H04L 67/32* (2013.01); *G06F 16/2471* (2019.01); *H04L 43/16* (2013.01); *H04L 45/7453* (2013.01); *H04L 47/70* (2013.01); *H04L 61/1552* (2013.01); *H04L 67/02* (2013.01); *H04L 67/1023* (2013.01); *H04L 67/42* (2013.01)

(58) Field of Classification Search
CPC ... H04L 67/143; H04L 63/0227; H04L 63/10; H04L 63/1425; H04L 63/1441; G06F 17/30902; G06F 17/30286; G06F 21/577
See application file for complete search history.

(56) References Cited

U.S. PATENT DOCUMENTS

| | | | |
|---|---|---|---|
| 9,483,286 B2 | 11/2016 | Basavaiah | |
| 9,705,895 B1* | 7/2017 | Gutzmann | .............. H04L 63/14 |
| 9,871,849 B2 | 1/2018 | Chauhan | |
| 9,967,236 B1* | 5/2018 | Ashley | .................. H04L 63/029 |
| 10,182,057 B1 | 1/2019 | Kumar | |

(Continued)

OTHER PUBLICATIONS

Bonomi et al. "An improved construction for counting bloom filters." Algorithms—ESA 2006. Springer Berlin Heidelberg, 2006. 684-695.

(Continued)

*Primary Examiner* — Etienne P Leroux
*Assistant Examiner* — Cindy Nguyen
(74) *Attorney, Agent, or Firm* — Adeli LLP

(57) ABSTRACT

Techniques described herein improve network security and traffic management. In an embodiment, a request associated with an identifier (ID) is received. It is determined whether the ID exists in a first membership database (MDB). If the ID exists in the first MDB, the request is serviced subject to a rate limit. If the ID does not exist in the first MDB, it is determined whether the ID exists in a second MDB. If the ID exists in the second MDB, the request is serviced. If the ID does not exist in the second MDB, the request is serviced subject to another rate limit. A response is received. The first and second MDBs can be updated based on the type of received response. In an embodiment, the response is classified as indicative of degraded or typical network performance, and the first and second MDBs are updated accordingly.

20 Claims, 4 Drawing Sheets

(56) References Cited

U.S. PATENT DOCUMENTS

| | | | | |
|---|---|---|---|---|
| 2005/0108551 | A1* | 5/2005 | Toomey | G06F 21/31 |
| | | | | 713/185 |
| 2007/0274340 | A1* | 11/2007 | Raveendran | H04N 21/234354 |
| | | | | 370/468 |
| 2009/0180430 | A1 | 7/2009 | Fadell | |
| 2010/0082811 | A1* | 4/2010 | Van Der Merwe | ............ |
| | | | | G06F 16/9535 |
| | | | | 709/225 |
| 2010/0274893 | A1* | 10/2010 | Abdelal | H04L 29/0602 |
| | | | | 709/224 |
| 2010/0322071 | A1* | 12/2010 | Avdanin | H04L 43/0894 |
| | | | | 370/230 |
| 2012/0158729 | A1* | 6/2012 | Mital | G06F 15/167 |
| | | | | 707/738 |
| 2012/0210421 | A1* | 8/2012 | Ormazabal | H04L 63/123 |
| | | | | 726/22 |
| 2013/0055358 | A1* | 2/2013 | Short | H04L 63/08 |
| | | | | 726/4 |
| 2019/0109851 | A1 | 4/2019 | Kumar | |

OTHER PUBLICATIONS

Peterson, Larry L., et al., "Computer Networks: A Systems Approach," 4th Edition, Month Unknown 2007, 5 pages, Elsevier Inc.

Varghese, George, "Network Algorithmics: An Interdisciplinary Approach to Designing Fast Networked Devices," Month Unknown 2005, 5 pages, Morgan Kaufman Publishers, San Francisco, CA, USA.

\* cited by examiner

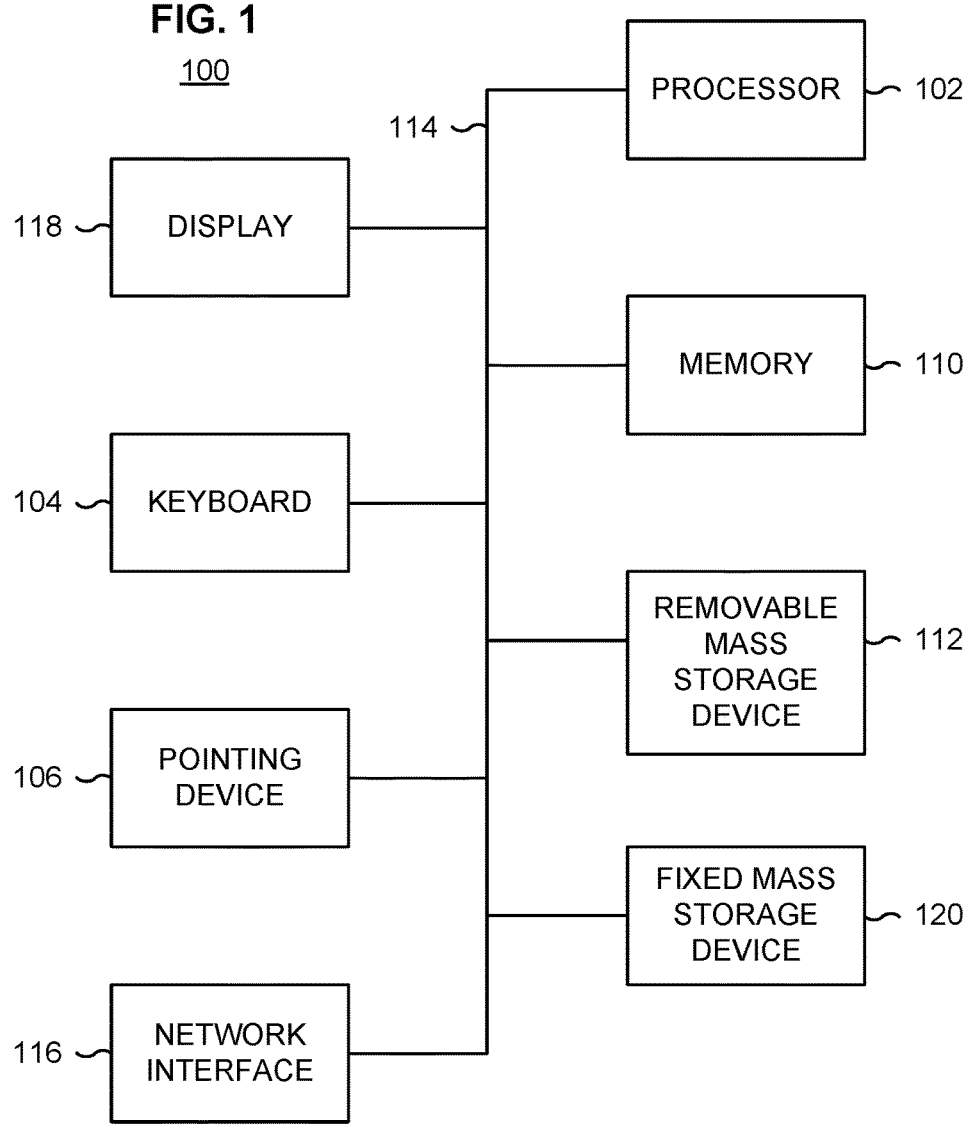
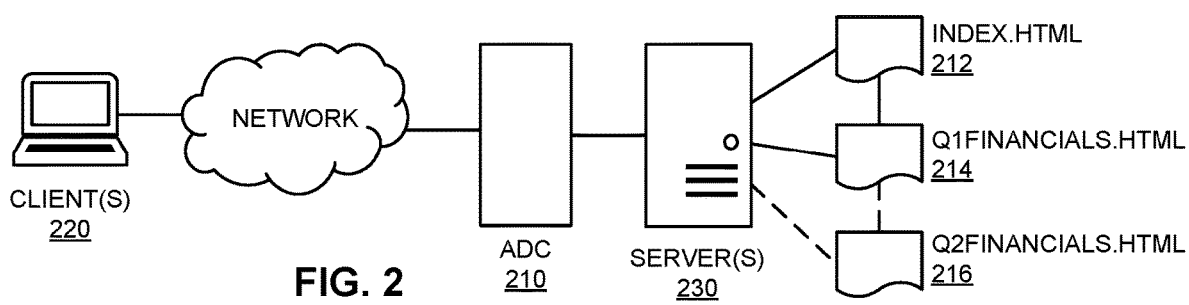

300

500

520     540     560

600

SCAN PROTECTION WITH RATE LIMITING

CROSS REFERENCE TO OTHER APPLICATIONS

This application claims priority to U.S. Provisional Patent Application No. 62/212,885 entitled SCAN PROTECTION WITH RATE LIMITING filed Sep. 1, 2015 which is incorporated herein by reference for all purposes.

BACKGROUND OF THE INVENTION

Managing traffic over a network involves making content available for access. Conventional techniques for managing network traffic use an application delivery controller (ADC), which is a network device that manages traffic. The ADC provides various functionalities such as load balancing data and resources hosted on multiple servers. For example, the ADC services client requests using servers, which provide content to the client in accordance with the request. Servers and content can join and leave the network, and, in some instances, the number of servers and set of available content can be large (e.g., on the order of hundreds of servers and billions of content). Mismanagement of client requests causes backend servers to be overwhelmed or overused. Conventional ADCs are typically computationally intensive (using large amounts of memory and power) and do not effectively manage client requests, including those requests that may be malicious. For example, a client may attempt to access content not ready for client consumption by "scanning," which involves systematically modifying a URI until a corresponding page is found. Therefore, there exists a need in the art for effective network traffic management.

BRIEF DESCRIPTION OF THE DRAWINGS

Various embodiments of the invention are disclosed in the following detailed description and the accompanying drawings.

FIG. 1 is a functional diagram illustrating a programmed computer system for implementing distributed network services in accordance with some embodiments.

FIG. 2 is a block diagram illustrating an embodiment of an application delivery network.

DETAILED DESCRIPTION

Figure 3:
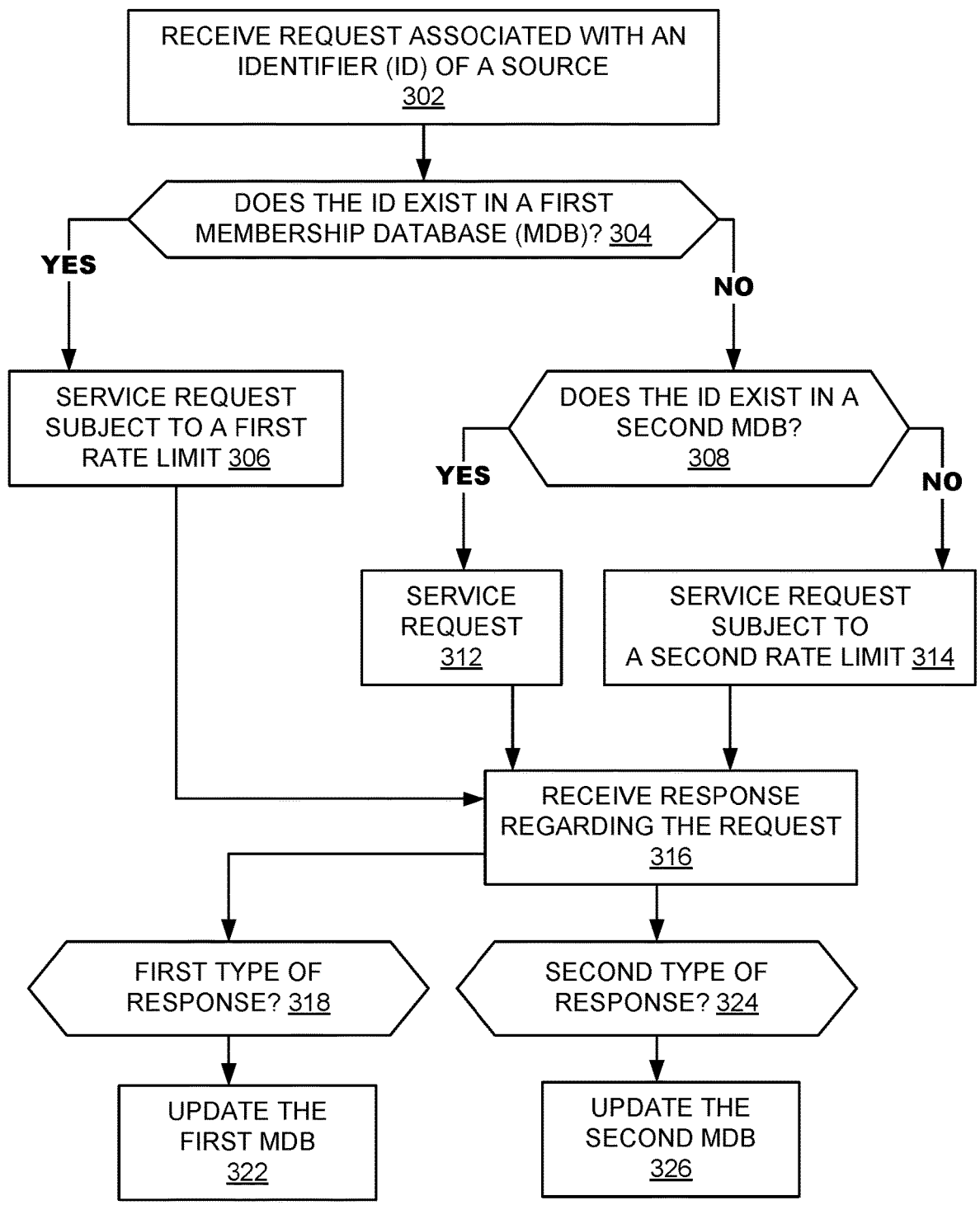
FIG. 3 is a flowchart illustrating an example embodiment of a process for managing network traffic including scan protection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques of the present disclosure manage network traffic including receiving a request associated with an identifier (ID), the ID identifying a source; determining whether the ID exists in a first membership data (MDB); in the event that the ID exists in the first MDB, servicing the request subject to a first rate limit; in the event that the ID does not exist in the first MDB, determining whether the ID exists in a second MDB; in the event that the ID that does not exist in the first MDB does not exist in the second MDB, servicing the request subject to a second rate limit; in the event that the ID that does not exist in the first MDB exists in the second MDB, servicing the request; subsequent to the request being serviced, receiving a response; determining that the response corresponds to a first type of response; and in response to the determination that the response corresponds to the first type of response, updating the first MDB based at least in part on the ID; in response to the determination that the response corresponds to the second type of response, updating the second MDB based at least in part on the ID.

FIG. 1 is a functional diagram illustrating a programmed computer system for network traffic management in accordance with some embodiments. For example, the computer system 100 can be included in an ADC. As will be apparent, other computer system architectures and configurations can be used to perform the described scanning detection and prevention technique. Computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, etc.). Using instructions retrieved from memory 110, processor 102 controls the reception and manipulation of input data received on an input device (e.g., pointing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

A removable mass storage device 112 provides additional data storage capacity for the computer system 100, and is optionally coupled either bi-directionally (read/write) or uni-directionally (read only) to processor 102. A fixed mass storage 120 can also, for example, provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, a pointing device 106, as well as other subsystems and devices. For example, pointing device 106 can include or operate in conjunction with a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing process/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detects user inputs and displays outputs to the user). In addition, bus 114 is illustrative of any interconnection scheme serving to link the subsystems. Other computer architectures having different configurations of subsystems can also be utilized.

The techniques described herein can be implemented by a processor such as an application delivery controller (ADC), a controller or other processor that receives client requests. The ADC can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In this example, the ADC is implemented as a network device that manages network traffic and allows clients to request web resources within an application delivery network.

FIG. 2 is a block diagram illustrating an embodiment of an application delivery network 200. The network 200 includes one or more clients 220, an ADC 210, one or more servers 230, and content 212, 214, 216. The client(s) 220 provide an interface for users to access content served by the server(s). The client(s) are implemented by any processing and/or computing device, for example, a smartphone, tablet, desktop, laptop, etc. A client can be identified, e.g., by an IP address. The client(s) can be communicatively coupled to the ADC 210 via a network. The network is implemented by any combination of circuit-switched and/or packet-switched networks and any combination of wired and/or wireless links.

The ADC 210 receives requests from the client(s) and directs requests to appropriate server(s). The ADC can be implemented according to the techniques described herein. The ADC handles requests made by a client such as a request for content. The ADC can forward the request to one or more servers 230. The server(s) 230 can receive a request processed by the ADC 210, determine requested content (also referred to as "a destination" of a request), and respond to the requests via the ADC 210.

Content includes various types or combinations of resources such as media items, files, dynamically generated responses, and the like. Content can be uniquely identified, e.g., by a uniform resource identifier (URI). In the example shown in FIG. 2, content 212, 214, 216 are web pages (e.g., Hypertext Markup Language (HTML) files). In some instances, some content can be isolated by policy from other content. However, the content may still be physically accessible. In FIG. 2, content 216 is isolated by policy from content 212, 214 (shown as linked to server(s) 230 and content 212, 214 by a dashed line representing the physical accessibility of content 216 although the content is isolated by policy). The reasons for isolating content are further described herein.

In operation, a client accesses the content 212, 214 by sending requests (e.g., Hypertext Transfer Protocol (HTTP) requests specifying the URIs corresponding to the HTML files) to the ADC 210. In response to receipt of the request, the ADC 210 routes the request to one or more of the servers 230. The server(s) then permit access to the appropriate content(s) 212, 214. In some instances, the ADC 210 can be configured to identify characteristics of a client request and block, admit, or rate limit the client request based on the identified characteristics. The characteristics of the client request include an identity of a requested resource, an identity of a client, a combination of the client and requested content, an impact of the client request on network performance, and the like.

The identity of requested content can affect how the client request is handled. For example, some content is not ready for client consumption. The content is not yet ready to be made publicly accessible for a variety of reasons. For example, a web page contains sensitive content (e.g., a financial statement that is not yet ready to be released.) The content can be intentionally or unintentionally made accessible, but not yet linked from a main website. For example, content under development is not linked to a main landing page but could be accessed if a corresponding URI is provided as part of a client request. In FIG. 2, content 216 is not yet ready to be accessed by any client (represented as missing links from other content 212, 214). However, conventionally, the page is accessible if a user or a program guesses its URI, which is similar to the URI of 214 in the example shown. A request for content that is not ready for client consumption should be avoided, e.g., by denying or rate limiting such requests.

The identity of a client can affect how the client request is handled. For example, clients that are not trustworthy, engage in malicious behavior, etc. can be blocked or rate limited at a pre-defined rate. Clients that are trustworthy, unknown, etc. can also be admitted or rate limited at a pre-defined rate.

A combination of the identity of a client and the identity of requested content can affect how the client request is handled. For example, a client may attempt to access content not ready for client consumption by "scanning." A client that practices scanning is referred to as a "scanner." A client "scans" for a page by modifying a URI. The client can systematically modify the URI (e.g., by coming up with combinations of URL strings) until a page is found. The page can a be a page desired by the client. In the example shown in FIG. 2, a client has access to "index.html" and "Q1financials.html" but it is not intended for the client to access "Q2financials.html." The client can attempt to access "Q2financials.html" by modifying the known URI for "Q1financials.html." In some instances, although a URI is a relatively obscure sequence of characters, the URI can nonetheless be guessed by a scanner that is allowed to make an arbitrary number of attempts. Thus, there is a need to manage network traffic, including preventing scanners from accessing content via scanning.

The impact of the client request on network performance can affect how the client request is handled. The techniques described herein find application in any situation in which network performance is impacted by client requests for content. When network characteristics are identified, rate limiting can be applied as described herein to improve network performance.

Conventional techniques typically determine whether to block, admit, or rate limit based on a "black list" and/or a "white list" maintained in memory. The "black list" includes identifiers of connections/clients that should be blocked from accessing the content. The "white list" includes identifiers of connections/clients that should be permitted to have their requests serviced. Clients that do not belong to the black list and the white list can be considered to be in a "grey list" that is not explicitly maintained.

These conventional techniques are computationally expensive and do not efficiently prevent scanning. This is because the effectiveness of preventing scanners from accessing content depends on accurate and timely maintenance of the black list and/or white list. However, clients and/or content can change quickly in a networking environment. An ADC also has limited memory and is hence unable to accommodate large lists. Moreover, denying a client request based on client ID can be ineffective when a client spoofs an IP address to attempt scanning. When a client spoofs an IP address, the client changes its IP address so that it appears to the ADC as a different client. The client is then able to bypass a system that relies on a black list and/or white list of client IDs to route requests.

Techniques of the present disclosure improve network traffic management by preventing scanning. Characteristics of client requests are determined and used to service the client requests. In some embodiments, client requests are rate limited based on a determined type of client request. The techniques described herein can limit or prevent network degradation caused by malicious client behavior such as scanning and improve the security of networks by preventing access of content not intended for consumption by particular clients. In one aspect, a client connection is "slowed down" by rate limiting, which effectively reduces the number of guesses made by a client attempting to access a content (e.g., URI). In another aspect, spoofing can be reduced or prevented by rate limiting based on requested content such that regardless of client identity, requests for particular content can be rate limited, as further described herein, e.g., in relation to FIG. 6. The techniques described herein find application in a variety of network traffic management situations.

FIG. 3 is a flowchart illustrating an example embodiment of a process 300 for managing network traffic including scan protection (protecting against scanning). The process 300 (also referred to as a "method") can be performed by a processor. The processor can be embodied in a device such as the system 100 shown in FIG. 1 or the ADC 210 shown in FIG. 2.

In 302, a request is received. The request is associated with an identifier (ID) of a source. As used herein, a source refers to an originator of a request such as a user, a device, and the like. The ID can be associated with the source of the request and include information that uniquely identifies the source, including an identifier of the requesting client ("client identifier"), an identifier of the requested content ("content identifier"), a combination thereof, or any other appropriate identification information. The client identifier can be an IP address of the client, the content identifier can be a URI of the requested content, etc. An identifier combining client and content can be one-to-one (particular client accessing particular content), one-to-many (particular client accessing any content), many-to-many (any client accessing any content), or many-to-one (any client accessing particular content). In an embodiment, an ID can be determined from the request. In an embodiment, the ID is a derivative of: a client identifier, a requested content identifier, or a combination thereof. For example, the ID can be derived from or be based on the client identifier, a requested content identifier, or a combination thereof. A client using a proxy can be identified by extracting the client identifier from the proxy-provided identification. The ID can be parsed or extracted from the request (e.g., from a header or payload of a transmitted packet).

In 304, it is determined whether the ID exists in a first membership database (MDB). The first MDB can be implemented by a data structure such as a table capable of tracking whether an element is a member of (e.g., stored in) the data structure, as further described herein. An example implementation of a first MDB is explained in greater detail in connection with FIG. 5A below. An ID exists in the first MDB if a particular piece of data is stored in the first MDB. The first MDB can track a first type of information, for example, a type of: client, request, response, combination thereof, etc. A first type of client is a client having characteristic(s) matching a profile. The profile can be pre-defined (e.g., by an administrator) and include parameters describing client characteristics. For example, a client is a first type of client if at least some of the requests (e.g., above a threshold) made by the client impact network performance differently from an average client. The impact of the first type of client can be compared with an impact of an average client to determine whether a client should be classified as a first type of client. The behavior of the first type of client causes network performance to degrade and/or creates a security vulnerability in a network system. For example, the first type of client requests includes content not intended for the client, content that has previously been determined to be of a first type (e.g., content that is not linked to the main page), those requests that occur very frequently (e.g., as measured against a threshold), performing disallowed functions, scanning by submitting requests for URIs that do not exist, and the like. In an embodiment, the ID exists in the first MDB if a first type of request has been previously made by a source associated with the ID. The tracking and storage of IDs in the first MDB is described further herein, e.g., with respect to FIG. 5A.

If the ID exists in the first MDB, control passes to 306 in which the received request is serviced subject to a first rate limit. The rate limit can be pre-defined. For example, the rate limit can be defined in terms of a number of attempted accesses per period. A counter can track a number of previous requests, and upon meeting or exceeding a threshold, rate limiting can be performed. As another example, the rate limit can be defined in terms of a number of bytes transmitted per period. A counter can track a number of bytes previously transmitted, and upon meeting or exceeding a threshold, the rate limiting operation is performed. The rate limiting operation can include at least one of: dropping a request such that the request is not serviced, logging information about the request, servicing the request if a pre-defined threshold has not been met, etc. In this example, control then passes to 316, in which a response regarding the request is received from a server, as further described herein.

In 304, if the ID does not exist in the first MDB, control passes to 308 in which it is determined whether the ID exists in a second MDB. The second MDB can be implemented by a data structure such as a table capable of tracking whether an element is a member of (e.g., stored in) the data structure, as further described herein. The second MDB can track a second type of information, for example a type of: client, request, response, combination thereof, etc. A second type of client is a client having characteristic(s) matching a profile. The profile can be pre-defined (e.g., by an administrator) and include parameters describing client characteristics. The profile associated with the second type of client can be different from a profile associated with the first type of client. For example, a client is a second type of client if the requests made by the client impact network performance similar to an average client. The impact of the second type of client can be compared with an impact of an average client or a threshold to determine whether a client should be classified as a second type of client. The behavior of the second type of client does not cause network performance to degrade or create a security vulnerability in a network system. Unlike the first type of client, the second type of client does not or rarely (e.g., below a threshold): requests content not intended for the client or content that has previously been determined to be of a first type (e.g., broken web page), makes requests at an atypical frequency (e.g., above a threshold), performs disallowed functions, scans, and the like. In an embodiment, the type of client tracked by the second MDB is different from the type of client tracked by the first MDB. In an embodiment, the ID exists in the second MDB if a second type of request has been previously made by a source associated with the ID. The tracking and storage of IDs in the second MDB is described further herein, e.g., with respect to FIG. 5B.

If the ID exists in the second MDB, control passes to 312 in which the request is serviced. For example, requested content can be provided to a requesting client, a token permitting access to request content can be provided to the requesting client, and the like. If the ID does not exist in the second MDB, control passes to 314 in which the request is serviced subject to a second rate limit. The rate limit can be pre-defined. For example, the rate limit can be defined in terms of a number of attempted accesses per period. A counter can track a number of previous requests, and upon meeting or exceeding a threshold, rate limiting can be performed. As another example, the rate limit can be defined in terms of a number of bytes transmitted per period. A counter can track a number of bytes previously transmitted, and upon meeting or exceeding a threshold, a rate limiting operation is performed. The rate limiting operation can include at least one of: dropping a request such that the request is not serviced, logging information about the request, servicing the request if a pre-defined threshold has not been met, etc.

The second rate limit can be different from the first rate limit used in 306. In an embodiment, the second rate limit is higher than the first rate limit. This has the effect of being less restrictive on access for a requesting client who has not yet been classified into the first MDB or the second MDB (e.g., a characteristic of the requesting client is "unknown"). This reduces the risk of degrading network performance (in case the client turns out to be malicious) because some rate limiting is performed while still providing acceptable service (in case the client turns out to be good).

In the example shown, after 306 or 314, the process 300 can continue to 316. In an alternative embodiment (not shown), the process 300 can simply terminate after 306, 312, or 314 without proceeding to 316. In 316, a response regarding the request is received from a remote server, e.g., a server servicing content corresponding to client requests. The first and second MDBs can be updated based on the received response as follows.

If the response is a first type of response (318), the first MDB is updated (322). The update can include performing a hash function on the corresponding ID and changing an entry of a bucket associated with the ID. For example, a received ID is hashed and a corresponding bucket entry updated to track receipt of the first type of response. The hashing and updating of the entry can be performed according to techniques further described herein, e.g., with respect to FIGS. 5A and 5B. For example, the entry can be changed by incrementing or decrementing a counter. For example, the counter can track a number of times that the first type of response has previously been received. The first type of response can be a response associated with degraded network performance such as a broken web page, as further described herein.

If the response is a second type of response (324), the second MDB is updated (326). The update can include changing an entry of a bucket associated with the ID. For example, the entry can be changed by incrementing or decrementing a counter. In this example, the counter tracks a number of times a second type of response has been received. The second type of response can be a response associated with typical (not degraded) network performance, as further described herein.

In some embodiments, a response to a particular client request can change over time. For example, a response is of a second type and a subsequent response is of a first type. This can occur when a web page is taken down between the first time and the second time (e.g., due to web page maintenance).

According to the techniques described herein, a scanner is prevented or rate limited from accessing content according to the techniques further described herein such that the scanner takes longer to guess a correct URI, allowing content providers more time to secure the content. The techniques described herein allow for a scalable and agile solution with very low overhead for managing network traffic and client access to content. Scanning detection and prevention improves network security by effectively and quickly identifying "malicious" clients and/or sensitive content and controlling access accordingly.

Figure 4A:
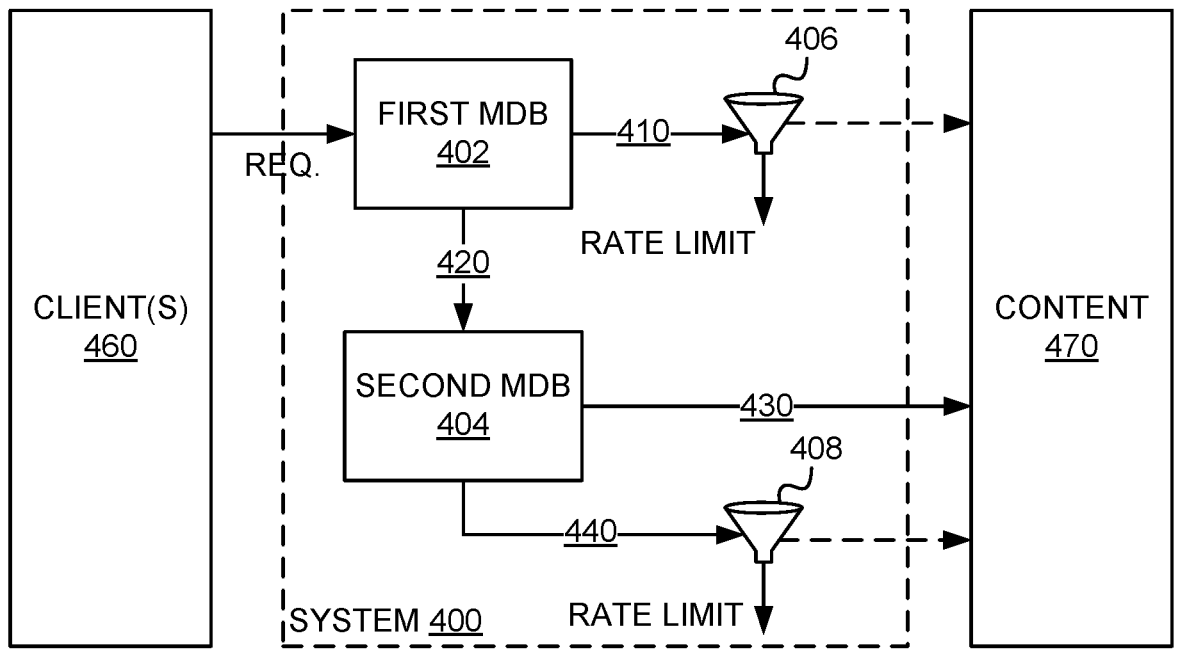
FIG. 4A is a block diagram illustrating an example embodiment of a system for managing network traffic including scan protection.

FIG. 4A is a block diagram illustrating an example embodiment of a system 400 for managing network traffic including scan protection. System 400 can be part of another system such as the ADC 210 shown in FIG. 2. As shown, the system can be coupled between one or more clients 460 and content 470 to receive client requests and service the client requests. The system includes a first MDB 402, a second MDB 404, and rate limiting filters 406 and 408. FIG. 4A illustrates an example of providing a request by the client(s) 460 for content 470.

The first MDB 402 can store a first type of data. The first MDB 402 can be implemented according to the techniques described herein, e.g., in relation to MDB 500 in FIG. 5A. The first type of data can include information about characteristics of the request such as client characteristics, requested content, a response to the requested content, and the like. In an embodiment, an identifier is stored in the first MDB 402 if a client and/or requested content associated with the identifier impacts network performance differently from an average client. A client is classified as a first type of client if the client causes network performance to degrade and/or creates a security vulnerability in a network system. For example, the first type of client requests content not intended for the client or content that has previously been determined to be of a first type (e.g., content that is not linked to the main page), makes very frequent (e.g., above a threshold) requests, performs disallowed functions and/or scanning, and the like, as further described herein, e.g., with respect to 304 of FIG. 3.

The second MDB 404 can store data of a second type. The second type of data can be different from the first type of data stored in the first MDB 402. The second MDB 404 can be implemented according to the techniques described herein, e.g., in relation to MDB 500 in FIG. 5B. The second type of data can include information about characteristics of the request such as client characteristics, requested content, a response to the requested content, and the like. In an embodiment, an identifier is stored in the second MDB 404 if the requests made by the client impact network performance similar to an average client. A client is classified as a second type of client if the behavior of the second type of client does not cause network performance to degrade or create a security vulnerability in a network system. Unlike the first type of client, the second type of client does not or rarely (e.g., below a threshold): requests content not intended for the client or content that has previously been determined to be of a first type (e.g., broken web page), makes requests at an atypical frequency (e.g., above a threshold), performs disallowed functions, scans, and the like, as further described herein, e.g., with respect to 308 of FIG. 3.

The rate limiting filter 406 (also referred to as "rate limiter") processes requests. In the example shown in FIG. 4A, the rate limiter 406 processes requests associated with the first MDB 402. A request is associated with the first MDB 402 if information associated with the request can be found in the first MDB 402. For example, the request is a first type of request. The rate limiter can drop the request, causing the request not to be serviced. For example, content corresponding to the request is not provided. The rate limiter can be implemented in various ways. In an embodiment, the rate limiter can log information about the request. For example, content corresponding to the request is provided and information about the request is logged. Logging can occur in a training mode of operation, in which a request is serviced and proposed ways of handling the request are logged, as further described herein. In an embodiment, the rate limiter can service the request if a threshold has not yet been met. For example, a counter can track a number of times requests associated with the first MDB 402 have been previously serviced. If the number of times that requests associated with the first MDB 402 have been previously serviced meets a threshold, the request can be serviced. Otherwise, the request can be dropped and/or logged. The threshold can be an upper threshold or lower threshold depending on whether the counter increments or decrements to track the number of previous requests. That is, an incrementing counter has an upper threshold and a decrementing counter has a lower threshold. The counter can track other parameters such as a number of bytes previously transferred. In an embodiment, the rate limiter 406 has a threshold of 10 times per second, allowing up to ten requests associated with the first MDB 402 to be serviced within one second. Requests beyond ten would be dropped and/or logged.

The rate limiting filter 408 (also referred to as "rate limiter") processes requests. In the example shown in FIG. 4A, the rate limiter 408 processes requests neither associated with the first MDB 402 nor associated with the second MDB 404. A request is associated with the second MDB 404 if information associated with the request can be found in the second MDB 404. For example, the request is a second type of request. The rate limiter can drop the request, causing the request not to be serviced. For example, content corresponding to the request is not provided. The rate limiter can log information about the request. For example, content corresponding to the request is provided and information about the request is logged. Logging can occur in a training mode of operation, in which a request is serviced and proposed ways of handling the request are logged. The rate limiter can service the request if a threshold has not yet been met. For example, a counter can track a number of times requests neither associated with the first MDB 402 nor associated with the second MDB 404 have been previously serviced. If the number of times that requests associated with the second MDB 404 have been previously serviced meets a threshold, the request can be serviced. Otherwise, the request can be dropped and/or logged. The threshold can be an upper threshold or lower threshold depending on whether the counter increments or decrements to track the number of previous requests. That is, an incrementing counter has a lower upper threshold and a decrementing counter has a lower threshold. The counter can track other parameters such as a number of bytes previously transferred. In an embodiment, the rate limiter 408 has a threshold of 50 times per second, e.g., allowing up to 50 requests neither associated with the first MDB 402 nor associated with the second MDB 404 to be serviced within one second. Requests beyond 50 would be dropped and/or logged.

In operation, the first MDB 402 receives a request. The first MDB 402 then determines whether the received request exists in the first MDB 402. For example, the determination can be made by looking up parameters obtained from the request in the first MDB. If the request exists in the first MDB 402, the request or a query associated with the request is passed along 410 to the rate limiter 406. The rate limiter 406 then services the request (or query) subject to a rate limit. For example, the rate limiter 406 can drop, log, or service the request, as further described herein. The request can be serviced by fetching content 470 that corresponds to the request (or query).

On the other hand, if the request does not exist in the first MDB 402, the request or a query associated with the request is passed along 420 to the second MDB 404. If the request exists in the second MDB 404, the request (or query) is passed along 430 such that the request is serviced by fetching content 470 that corresponds to the request (or query). If the request does not exist in the second MDB 404, the request (or query) is passed along 440 to the rate limiter 408. The rate limiter 408 then services the request (or query) subject to a rate limit. For example, the rate limiter 408 can drop, log, or service the request, as further described herein. The request can be serviced by fetching content 470 that corresponds to the request (or query).

For example, requests that negatively impact network performance are associated with the first MDB 402 and requests that do not negatively impact network performance are associated with the second MDB 404. This means that when a request is determined to negatively impact network performance, associated information (e.g., client ID, content ID, etc.) is stored in the first MDB 402 and when a request is determined to not negatively impact network performance, associated information (e.g., client ID, content ID, etc.) is stored in the second MDB 404. "Unknown" requests are not stored in either the first MDB 402 or the second MDB 404. A request can be "unknown" if a likelihood of the request negatively impacting network performance has not yet been determined. For example, if the number of times the request has elicited a particular type of response does not meet a threshold, then the request is unknown.

In this example, rate limiter 406 has a relatively low threshold (e.g., 10 times/second), allowing few requests to be serviced because the requests passing through 410 are likely to negatively impact network performance. Rate limiter 408 has a relatively high threshold (e.g., 50 times/second), allowing more requests to be serviced because whether requests passing through 440 negatively impact network performance is unknown. In other words, the rate limiter 408 can be less restrictive than the rate limiter 406 because "unknown" requests are not as likely as requests associated with the first MDB 402 to negatively impact network performance.

Although not shown, a rate limiter coupled between the second MDB 404 and content 470 on path 430 would have a relatively high threshold (e.g., 1000 times/second), allowing more requests to be serviced because the requests passing through 430 do not negatively impact network performance.

In an embodiment, processing requests in this manner slows down an unknown user. When the unknown user makes more requests, the user is determined to be good or bad. Based on the determination, the user can be treated appropriately. By slowing down an unknown user, in case the user is bad, more damage can be prevented than compared with conventional techniques.

In an embodiment, the MDB can be populated in a training mode. In the training mode, a proposed action is logged instead of or in addition to being performed. This allows for the system to be adjusted or optimized. For example, the logs can be compared with a desired logging pattern to determine whether the system is sufficiently optimized. For example, the logging pattern corresponds to a desired response to a request such as a frequency of dropping requests, dropping a request in response to a particular type of request, and the like. In a training mode, a particular rate limiting criteria can cause many (above a threshold) to be logged, which might be too restrictive. The rate limiting criteria can then be adjusted so that requests are dropped at an appropriate rate. In an alternative embodiment, in the training mode, some proposed actions are logged, some proposed actions are performed, and some proposed actions are logged and performed.

Figure 4B:
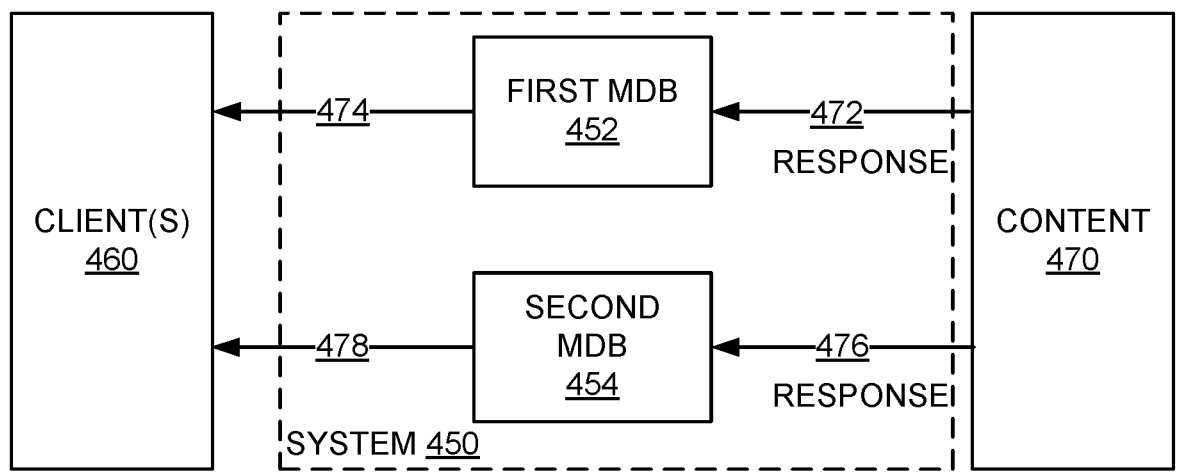
FIG. 4B is a block diagram illustrating an example embodiment of a system for managing network traffic including scan protection.

FIG. 4B is a block diagram illustrating an example embodiment of a system 450 for scan protection with rate limiting. System 450 can be part of another system such as the ADC 210 shown in FIG. 2. The system 450 can include the same elements as the system 400. The system includes a first MDB 452 and a second MDB 454. For simplicity, rate limiters are not shown in FIG. 4B. FIG. 4B illustrates an example of servicing a request by fetching content 470 corresponding to a request and "returning" the content to the client(s) 460. As shown, the system can be coupled between one or more clients 460 and content 470 to receive client requests and service the client requests.

The MDB 452 can store a first type of data. The MDB 452 can be implemented according to the techniques described herein, e.g. in relation to MDB 500 in FIG. 5. The first type of data can include information about characteristics of the request such as client characteristics, requested content, a response to the requested content, and the like. In an embodiment, an identifier is stored in the MDB 452 if a client and/or requested content associated with the identifier impacts network performance differently from an average client. A client is classified as a first type of client if the client causes network performance to degrade and/or creates a security vulnerability in a network system. For example, the first type of client requests content not intended for the client, content that has previously been determined to be of a first type (e.g., content not linked to the main web page), makes very frequent (e.g., above a threshold) requests, performing disallowed functions, scanning, and the like, as further described herein, e.g., with respect to 304 of FIG. 3. As another example, the first type of client requests includes requests causing a response that: a page that cannot be found (e.g., an HTTP 404 error message is received in response to a request for the page), a page with a slow response (responding after a threshold period of time), a page has not been requested in a long time (requested after a threshold length of time, e.g., one month), a page is expected to be rarely accessed but in fact is frequently accessed (receives a number of requests above a threshold), the request is illegitimate (e.g., cannot be fulfilled because the requested URI does not link to a functional page), and the like.

The MDB 454 can store data of a second type of data. The second type of data can be different from the first type of data stored in the MDB 452. The MDB 454 can be implemented according to the techniques described herein, e.g., in relation to MDB 500 in FIG. 5A. The second type of data can include information about characteristics of the request such as client characteristics, requested content, a response to the requested content, and the like. In an embodiment, an identifier is stored in the MDB 454 if the requests made by the client impact network performance similarly with an average client. A client is classified as a first type of client if the behavior of the second type of client does not cause network performance to degrade or create a security vulnerability in a network system. Unlike the first type of client, the second type of client does not or rarely (e.g., below a threshold): requests content not intended for the client or content that has previously been determined to be of a first type (e.g., broken web page), makes requests at a typical frequency (e.g., below a threshold), performs disallowed functions, scans, and the like, as further described herein, e.g., with respect to 308 of FIG. 3.

In operation, content 470 is provided to client(s) 460 as follows. It is determined whether a response is a first type of response. If the response is a first type of response, the response is passed via 472 to the first MDB 452. Request ID of the first type of response is stored in the first MDB 452. The response can be stored in the MDB 452 according to the techniques described herein, e.g., in relation to FIGS. 5A and 5B. The response can then be provided to the client(s) 460 via 474. Otherwise, if the response is a second type of response, the response is passed via 476 to the second MDB 454. Request ID of the second type of response is stored in the second MDB 454 according to the techniques described herein, e.g., in relation to FIGS. 5A and 5B. The response can then be provided to the client(s) 460 via 478.

For example, a first type of response is a response that matches a profile. For instance, the requested content can be of a particular type such as a broken web page, requiring authentication information the client did not provide, etc. As another example, the requested content can be provided at a frequency meeting a threshold. If the requested content has been previously requested and/or provided more than is expected for that type of content, the response can be classified as the first type. The second type of response is a response that matches a profile, which can be different from a profile for the first type of response. For instance, the requested content can be of a particular type such as a well-behaved (not broken) web page. As another example, requested content has been previously requested and/or provided as expected for that type of content.

Process 300 will now be described using the example of FIGS. 4A and 4B. FIG. 4A shows the path of a request being received from client(s) and serviced via MDB(s) and rate limiter(s). Information from a received request (302 of FIG. 3) is checked against the first MDB 402. For example, it is determined whether a client ID corresponding to the received request exists in the first MDB 402 (304 of FIG. 3). If the client ID corresponding to the received request exists in the first MDB 402, the request is processed along path 410 by being serviced subject to a rate limit by rate limiter 406 (306 of FIG. 3).

If the client ID corresponding to the received request does not exist in the first MDB 402, the request can be processed along path 420 as follows. It is determined whether a client ID corresponding to the received request exists in the second MDB 404 (308 of FIG. 3). If the client ID corresponding to the received request exists in the second MDB 404, the request is serviced via path 430 (312 of FIG. 3). Although not shown, the request can be serviced subject to a rate limit on path 430, as further described herein. If the client ID corresponding to the received request does not exist in the second MDB 404, the request is processed along path 440 by being serviced subject to rate limiter 408 (314 of FIG. 3).

Received responses to the request can be used to update the MDBs as follows. Turning to FIG. 4B, which shows paths of a response being passed from content 470 to client(s) 460, the first MDB 452 and the second MDB 454 are updated as follows. Content can be determined to be a first type of content based on a response of the content to a request. The response can be received from a remote server such as the server(s) 230 shown in FIG. 2. Examples are a page that cannot be found (e.g., an HTTP 404 error message is received in response to a request for the page), a page with a slow response (responding after a threshold period of time), a page that has not been requested in a long time (requested after a threshold length of time, e.g., one month), a page that is expected to be rarely accessed but becomes popular (receives a number of requests above a threshold), the request is illegitimate (e.g., cannot be fulfilled because the requested URI does not link to a functional page), and the like. Content can be determined to be a second type of content based on a response that does not exhibit the characteristics of the first type of content.

Figures 5A, 5B, 6:
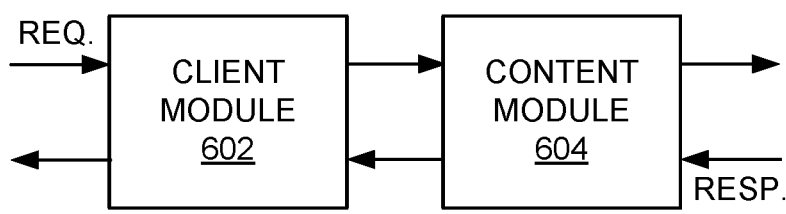
FIG. 5A is a functional diagram illustrating an example embodiment of a membership database (MDB).
FIG. 5B is a functional diagram illustrating an example embodiment of a membership database (MDB).
FIG. 6 is a block diagram illustrating an example embodiment of a system for managing network traffic including scan protection.

FIG. 5A is a functional diagram illustrating an example embodiment of an MDB 500. The MDB 500 can be implemented by a data structure capable of tracking whether an element is stored in the data structure. For example, each MDB tracks whether a client has previously made a request by tracking whether and/or how a request from the client is serviced letting in a client and recording that the client has been permitted access.

In the example shown in FIG. 5A, the MDB is implemented by a counting bloom filter (CBF) or hash table having buckets A-G (the number of buckets is configurable and can be set according to the filter configuration). When an ID corresponding to a client request is received, the ID is hashed using one or more hash functions. Hashing the ID causes a hit in a bucket and an entry of that bucket is updated. For example, the entry of a bucket can be initialized to 0 and a hit causes the entry to increment. The entry can be implemented using a counter to track and increment the number of hits to the bucket.

The example shown in FIG. 5A is a state of the MDB after receiving a client request with a first ID, ID1. In this example, three hash functions are performed for a received client request, and the client request results in three hits in the MDB (shaded buckets B, E, and F) as follows. When a client request containing ID1 is received, three hash functions are performed on ID1. In the example shown, the hash functions are $h_1(ID1)$=bucket B, where $h_1$ is a first hash function; $h_2(ID1)$=bucket E, where $h_2$ is a second hash function; and $h_3(ID1)$=bucket F, where $h_3$ is a third hash function. Examples of a hash function include a cryptographic hash function such as MD5, SHA-1, SHA-2, etc. Since there are hits in buckets B, E, and F, counters for each of the buckets are incremented, resulting in counter=1 as shown in FIG. 5A.

Suppose that a second client request with ID1 is made. To determine whether a client request with ID1 has been previously made, it is determined whether bucket(s) corresponding to the hash functions of ID1 in the MDB are non-zero. If the buckets are non-zero, then the client has previously made a request. When the second client request with ID1 is made, hash functions $h_1(ID1)$=bucket B, $h_2(ID1)$=bucket E, and $h_3(ID1)$=bucket F are performed. Turning to FIG. 5A, all of the buckets B, E, and F corresponding to a hit are non-zero. Thus, the second client request for ID1 has been previously made. In other words, ID1 exists (is stored) in the MDB 500.

FIG. 5B is a functional diagram illustrating an example embodiment of MDBs 520, 540, and 560. Each of the MDBs 520, 540, and 560 can be implemented by a data structure capable of tracking whether an element is stored in the data structure. For example, each MDB tracks whether a client has previously made a request by tracking whether and/or how a request from the client is serviced letting in a client and recording that the client has been permitted access. That is, a first hash function updates a first MDB 520 without updating the other MDBs 540 and 560, a second hash function updates a second MDB 540 without updating the other MDBs 520 and 560, and a third hash function updates a third MDB 560 without updating the other MDBs 520 and 540.

In the example shown in FIG. 5B, each of the MDBs 520, 540, and 560 are implemented by a counting bloom filter (CBF) or hash table having buckets A-G (the number of buckets is configurable and can be set according to the filter configuration). When an ID corresponding to a client request is received, the ID is hashed using one or more hash functions. In this embodiment, unlike the one shown in FIG. 5A (in which a single hash table may correspond to multiple hash function), a separate hash table is used for each hash function. Hashing the ID causes a hit in a bucket of the corresponding hash table and an entry of that bucket is updated. For example, the entry of a bucket can be initialized to 0 and a hit causes the entry to increment. The entry can be implemented using a counter to track and increment the number of hits to the bucket.

The example shown in FIG. 5B is a state of the MDB 520 after receiving a client request with a first ID, ID1. In this example, three hash functions are performed for a received client request, and the client request results in three hits in the respective MDB (shaded buckets B, E, and F) as follows. When a client request containing ID1 is received, three hash functions are performed on ID1. In the example shown, the hash functions are $h_1(ID1)$=bucket B, where $h_1$ is a first hash function corresponding to MDB 520; $h_2(ID1)$=bucket E, where $h_2$ is a second hash function corresponding to MDB 540; and $h_3(ID1)$=bucket F, where $h_3$ is a third hash function corresponding to MDB 560. Examples of a hash function include a cryptographic hash function such as MD5, SHA-1, SHA-2, etc. Since there are hits in buckets B, E, and F, counters for each of the buckets are incremented in their respective hash tables, resulting in counter=1 as shown in FIG. 5B.

Suppose that a second client request with ID1 is made. To determine whether a client request with ID1 has been previously made, it is determined whether bucket(s) corresponding to the hash functions of ID1 in the respective hash tables in the MDB are non-zero. If the buckets are non-zero, then the client has previously made a request. When the second client request with ID1 is made, hash functions $h_1(ID1)$=bucket B, $h_2(ID1)$=bucket E, and $h_3(ID1)$=bucket F are performed. Turning to FIG. 5B, all of the buckets B, E, and F corresponding to a hit are non-zero in the respective hash tables. Thus, a client request for ID1 has been previously made. In other words, ID1 exists (is stored) in the MDBs 520, 540, and 560.

In some embodiments, over time, the MDB becomes filled as requests are received. When two different requests are hashed to the same bucket(s), a hash collision occurs. Hash collisions become more likely as more requests are received and the MDB becomes more filled. Hash collisions in the MDB can reduce the accuracy of tracking whether a request has been received before because a collision gives a false positive. To improve accuracy, entries in the MDB can be aged and/or the MDB can be resized.

In some embodiments, hash collisions are reduced by aging the MDB. Aging can be implemented by changing one or more entries in a variety of ways. The one or more entries can be changed by reducing the entry by a factor. For entries including a counter, the counter can be reset or re-initialized. The aging can be performed periodically or at a pre-defined time according to system configuration. The timing can be managed by a timer such that a counter is decreased by a pre-defined amount. For example, after a period (e.g., 10 minutes) of inactivity for an ID, a counter is reset to zero. As another example, each entry in the MDB can be halved every 30 seconds. The timing of aging and/or the amount by which to change entries can be performed based on desired behavior such as how much history to track. More frequent refreshing corresponds to tracking more recent history compared with less frequent refreshing. This allows the system to dynamically track characteristics of clients. Aging the table improves MDBs efficiently over relatively long periods of time even when tracking numerous IDs (e.g., on the order of billions).

In some embodiments, hash collisions are reduced by resizing the MDB. Resizing can be based on how many of a particular type of entry is in the MDB. For example, the particular type of entry can be those entries having a value of 0 (also referred to as "empty" entries). Empty entries mean that an ID has not been previously requested. If the number of empty entries meets a threshold, the MDB can be downsized. For example, a number of buckets in the MDB can be removed so that the MDB is capable of storing fewer entries. If the number of zero entries does not meet a threshold, the MDB can be upsized. For example, a number of buckets in the MDB can be added so that the MDB is capable of storing more entries. The selection of the threshold and resizing can be performed in accordance with predefined (e.g., user-specified) parameters. For example, for a traffic mix comprised of a few thousand different clients of which only a few are of the first type, the first MDB can be sized to have a few hundred buckets. For example, if there are relatively many zeros in the MDB, the table is too large and space can be saved while reasonably avoiding hash collisions by downsizing the MDB.

In an alternative embodiment, resizing can be performed according to user specifications. In yet another embodiment, resizing can be based on a virtual service weight ("VS weight"). The VS weight can describe the servicing of requests, where a content is serviced by a virtual server. For example, a VS weight=1 can correspond to sizing the MDB to 1000 buckets and a VS weight=2 can correspond to sizing the MDB to 2000 buckets. A user can set a VS weight based on anticipated needs. Resizing can be performed periodically, e.g., hourly. For example, checking for zero entries can be performed periodically and resizing performed, if appropriate. Memory can also be saved by sizing an MDB appropriately.

In IP address spoofing, a client's IP address is changed so that it appears to the ADC as a different user. The client is then able to bypass a system that relies on a black list and/or white list to route requests, which may slow the connection. Techniques of the present disclosure prevent spoofing by determining characteristics of requested content such that even if a client is spoofing, the client is rate limited.

FIG. 6 is a block diagram illustrating an example embodiment of a system 600 for managing network traffic including scan protection. The system 600 includes a client module 602 and a content module 604. The client module 602 tracks IDs of a client, e.g., an IP address of a requesting client. The content module 604 tracks IDs of requested content, e.g., URIs. The client module 602 and the content module 604 can be communicatively coupled. In the example shown, the request is received and processed by the client module 602, then passed to the content module 604. A response is received by the content module 604, then passed to the client module 602. The order of the client module 602 and content module 604 is shown for illustrative purposes. In an alternative embodiment (not shown), the content module 604 can receive the request, then pass the request to the client module 602.

Each of the client module 602 and the content module 604 can be implemented by one or more systems such as the systems 400 and 450 shown in FIGS. 4A and 4B. By coupling two systems in the manner shown, both a client ID and content ID can be evaluated. The evaluation can include determining whether the client and content, alone or in combination, degrade network performance. This prevents a spoofing problem by rate limiting based on a client ID and content ID so that even if a client spoofs an IP address and attempts to gain access to content, the client is rate limited and/or denied permission.

In one aspect, the described techniques are scalable and dynamic, saving memory by dispensing with the need to maintain explicit black and white lists of clients. Instead, determination about a client and/or content can be made based on a response from the server about whether the request triggered an undesirable response (e.g., causing network degradation). The described techniques are flexible because a status of content (e.g., a previously broken web page is fixed) need not be communicated to an ADC each time there is a change. The status of the content is automatically detected and noted in the corresponding MDB. The techniques described herein effectively and efficiently prevent information from being leaked, for example, when a client attempts to access sensitive information by scanning. The techniques described herein improve the functioning of a computer by identifying clients and/or content that degrades network performance and blocking or rate limiting a corresponding connection.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing client requests using first and second membership databases (MDBs), comprising:
   receiving a plurality of requests to access content, each request associated with an identifier (ID) that identifies a source of the request and the requested content;
   for a first request in the plurality of requests for which an associated, first ID exists in a first MDB, servicing the first request for the content subject to a first non-zero rate limit;
   for a second request in the plurality of requests for which an associated, second ID does not exist in the first MDB and does exist in a second MDB, servicing the second request for the content; and
   for a third request in the plurality of requests for which an associated, third ID does not exist in either the first MDB or the second MDB, servicing the third request for the content subject to a second non-zero rate limit that is less restrictive than the first non-zero rate limit to permit more requests to be serviced subject to the second non-zero rate limit compared with the first non-zero rate limit.

2. The method of claim 1 further comprising:
   receiving a first type of response from a content server in response to a fourth request in the plurality of requests, wherein the first type of response indicates a problematic request;
   based on the response to the fourth request being of the first type, updating the first MDB based at least in part on a fourth ID associated with the fourth request to apply the first non-zero rate limit to subsequent requests associated with the fourth ID;
   receiving a second type of response from a content server in response to a fifth request in the plurality of requests, wherein the second type of response indicates a proper request; and
   based on the response to the fifth request being of the second type, updating the second MDB based at least in part on a fifth ID associated with the fifth request so that subsequent requests associated with the fifth ID will be processed without applying the first or second rate limit.

3. The method of claim 1, wherein the first MDB is used to identify connections associated with degraded network performance.

4. The method of claim 1, wherein the second MDB is used to identify connections associated with network performance meeting a threshold.

5. The method of claim 1, wherein at least one of the first MDB and the second MDB includes a counting bloom filter.

6. The method of claim 1 further comprising determining that the first ID exists in the first MDB by:
performing a set of different hash functions on the first ID to compute a set of hash results, each of the hash results corresponding to a bucket of a hash table; and
determining that the first ID exists in the first MDB when each of the buckets of the hash table stores a non-zero value.

7. The method of claim 1, wherein an ID associated with a particular request corresponds to an IP address associated with the particular request.

8. The method of claim 1, wherein an ID associated with a particular request corresponds to a uniform resource identifier (URI) associated with a destination of the particular request.

9. The method of claim 1, wherein at least one of servicing the first request and servicing the third request comprises logging a proposed action for servicing the serviced request.

10. The method of claim 1, wherein a size of at least one of the first MDB and the second MDB is configurable.

11. The method of claim 1 further comprising:
detecting that a number of empty entries in a particular MDB meets a threshold, wherein the particular MDB is one of the first MDB and the second MDB; and
in response to the detection that the number of empty entries in the particular MDB meets the threshold, downsizing the particular MDB.

12. The method of claim 1 further comprising:
detecting that a number of empty entries in a particular MDB is below a threshold, wherein the particular MDB is one of the first MDB and the second MDB; and
in response to the detection that the number of empty entries in the particular MDB is below the threshold, upsizing the particular MDB.

13. The method of claim 1 further comprising reducing values of entries in the first MDB and the second MDB by a predefined amount at a predefined frequency.

14. A system, comprising:
a set of processing units; and
a non-transitory machine readable medium storing a program for execution by at least one of the processing units, the program comprising sets of instructions for:
receiving a request to access content, the request associated with an identifier (ID) that identifies a source of the request and the requested content;
when the ID exists in a first membership database (MDB), servicing the request for the content subject to a first non-zero rate limit to improve network security;
when the ID does not exist in the first MDB and does exist in a second MDB servicing the request for the content;
when the ID does not exist in either the first MDB or the second MDB, servicing the request for the content subject to a second non-zero rate limit that is less restrictive than the first non-zero rate limit to permit more requests to be serviced than would be serviced at the first non-zero rate limit.

15. The system of claim 14, wherein the non-transitory machine readable medium further stores a set of instructions for, after receiving a first type of response from a content server indicating that the request was problematic, updating the first MDB based at least in part on the ID, the set of instructions for updating the MDB comprising sets of instructions for:
performing a set of hash functions on the ID; and
updating a set of entries in the first MDB, each of the entries in the set of entries associated with a result of one of the hash functions of the set of hash functions.

16. A non-transitory machine readable storage medium storing a program for execution by at least one processing unit of an application delivery controller (ADC) that receives a plurality of requests from a set of client devices and directs each request to a server in a set of servers, the program comprising sets of instructions for:
receiving a request to access content, the request associated with an identifier (ID) that identifies a source of the request and the requested content;
when the ID exists in a first membership database (MDB), servicing the request for the content subject to a first non-zero rate limit to improve network security;
when the ID does not exist in the first MDB and does exist in a second MDB, servicing the request for the content;
when the ID does not exist in either the first MDB or the second MDB, servicing the request for the content subject to a second non-zero rate limit that is less restrictive than the first non-zero rate limit to permit more requests to be serviced than would be serviced at the first non-zero rate limit.

17. The non-transitory machine readable storage medium of claim 16, wherein the program further comprises a set of instructions for:
computing a plurality of hashes of the ID using a plurality of different hash functions; and
determining whether the ID exists in the first MDB by determining whether entries of the MDB corresponding to each of the hashes of the plurality of hashes is non-zero, wherein the ID exists in the first MDB when each of the entries of the MDB corresponding to the hashes is non-zero.

18. The non-transitory machine readable storage medium of claim 17, wherein:
the second MDB comprises a separate table for each of the different hash functions;
the program further comprises sets of instructions for, when the ID does not exist in the first MDB, determining whether the ID exists in the second MDB by determining, for each particular table for a particular one of the hash functions, whether an entry of the particular table corresponding to the hash of the ID computed for the particular hash function is non-zero; and
the ID exists in the second MDB when each entry of each particular table corresponding to the hash of the ID computed for the particular hash function of the particular table is non-zero.

19. The non-transitory machine readable storage medium of claim 16, wherein the first MDB comprises a single counting bloom filter and the second MDB comprises a plurality of counting bloom filters.

20. The system of claim 14, wherein the set of instructions for servicing the request comprises a set of instructions for directing the request to one content server of a set of content servers.

* * * * *